July 21, 1925.
C. L. SCHMIDT
MEASURING INSTRUMENT
Filed Feb. 12, 1924
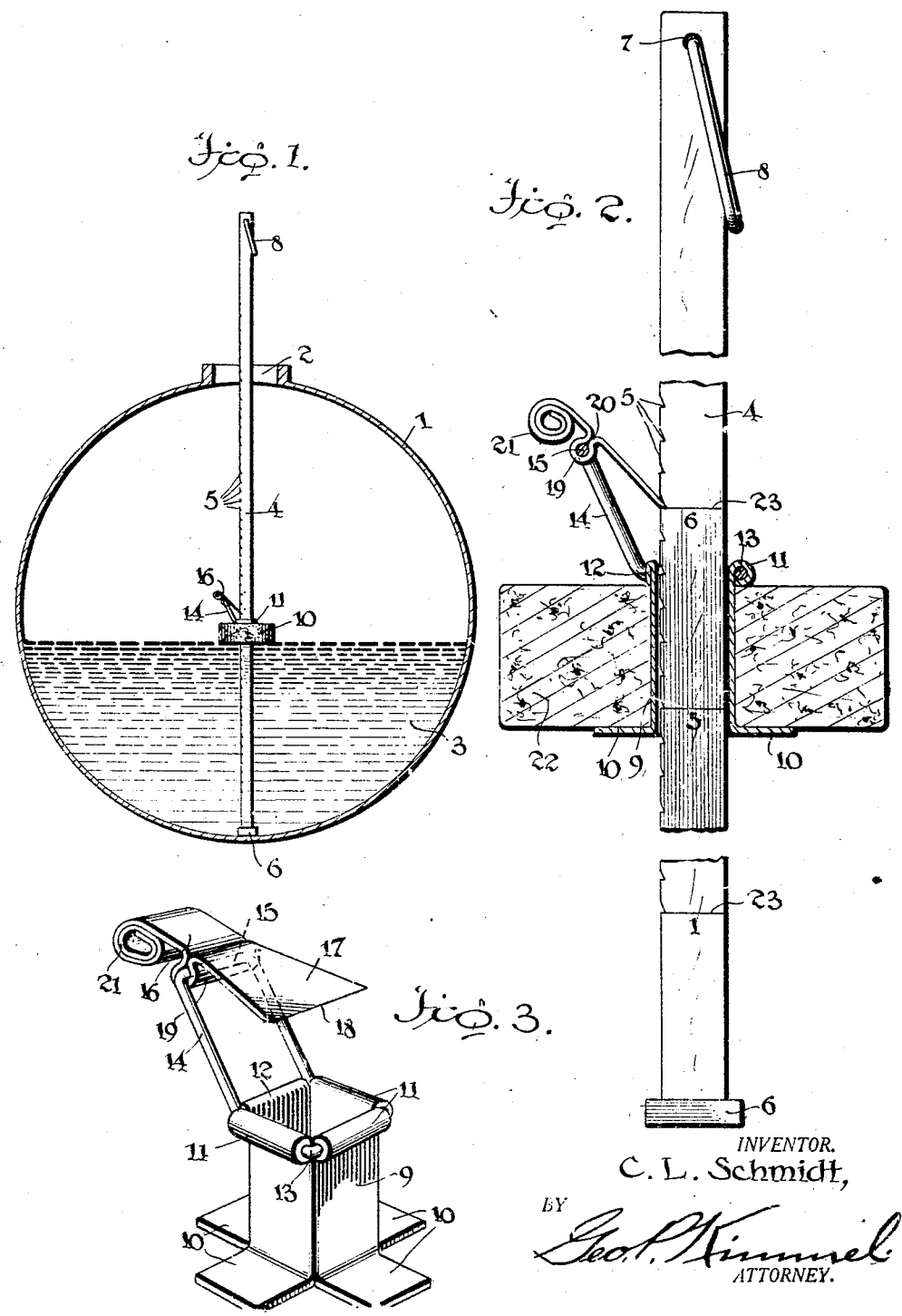
INVENTOR.
C. L. Schmidt,
BY
Geo. P. Kimmel
ATTORNEY.

Patented July 21, 1925.

1,546,409

UNITED STATES PATENT OFFICE.

CHARLES L. SCHMIDT, OF HARRISBURG, PENNSYLVANIA.

MEASURING INSTRUMENT.

Application filed February 12, 1924. Serial No. 692,258.

*To all whom it may concern:*

Be it known that I, CHARLES L. SCHMIDT, a citizen of the United States, residing at Harrisburg, in the county of Dauphin and State of Pennsylvania, have invented certain new and useful Improvements in Measuring Instruments, of which the following is a specification.

This invention relates to measuring instruments and pertains especially to that class of instruments known as ullage-rods.

The primary object of this invention is the provision, in a manner as hereinafter set forth, of a measuring rod for use in determining the quantity of fluid in a tank, through the action of the fluid upon a float, the float being automatically secured at the point upon the rod to which it is raised by the buoyant action of the fluid.

A further action of the invention is the provision in a manner as hereinafter set forth, of a measuring rod having an improved means for slidably retaining thereon a float and latch element.

The final object is the provision, in a manner as hereafter set forth, of a measuring rod of improved design, easily operated, giving accurate indication, light in weight, strong, durable, and inexpensive to manufacture.

The device will be best understood from a consideration of the following detail description taken in connection with the accompanying drawings forming part of this specification, with the understanding that the invention is not confined to any strict conformity with the showing of the drawings but may be changed and modified so long as such changes and modifications mark no material departure from the salient features of the invention as expressed in the appended claims.

In the drawings:

Figure 1 is a vertical transverse sectional view taken through a tank containing a liquid and showing the device embodying this invention in side elevation and positioned in the tank.

Figure 2 is a view partly in section and partly in elevation of the device embodying this invention, and, Figure 3 is a detail perspective view showing the slidable float and latch carrying collar.

Referring now to the drawings in detail wherein like numerals of reference indicate corresponding parts throughout the several views shown, a tank containing a liquid such as is commonly used for the storage of gasoline and other fluid is indicated at 1, having the opening 2, and shown as being partially filled with a fluid 3.

The device embodying this invention comprises a rod 4 of substantial length, having across one side a series of transverse notches 5, the series extending throughout the greater portion of the length of the rod terminating a short distance inwardly of each end. At the lower end of the rod 4 there is formed or secured a base or foot 6 while at the upper end there is passed through an aperture 7 provided in the rod 4 a ring 8 by which the rod may be lowered into the tank. Loosely surrounding the rod 4 is a collar 9 which collar is preferably formed of a single piece of material, preferably metal, and is bent to form the four vertical walls as shown. This collar is split upwardly from the lower edge and at each corner, and each of the four portions thus formed between these splits is turned outwardly at right angles to its respective side of the collar providing the four right angularly extending arms 10 at the lower end of the collar body. The body at its upper edge is also split downwardly at the corners for a short distance and the top edges of three of the four sides of the collar are rolled as shown at 11, while the fourth side has its top edge turned back upon itself as indicated at 12. The rolled top edges 11 of the three sides have passed through the apertures formed as the result of the rolling of the edges, a wire 13 of substantial weight which is formed upon the side 12 to provide the outwardly and upwardly extending frame 14. This frame as shown is of rectangular contour and the short side 15 thereof extends across the width of the collar 9.

Pivotally supported upon this short side bar 15 of the frame 14 is a latch member indicated as a whole at 16. This latch member is formed of a strip of metal and has one end flared or of greater width than the balance of the body as indicated at 17 and the terminal edge of this end of the latch is sharpened as at 18. The central portion of the latch body 16 is formed to provide the circular bearing 19 having the open side 20, by means of which open side the cross bar 15 of the supporting frame 14 is forced into the bearing 19 and the latch finger 16, as is clearly shown in Figure 3 of the drawing, is pivotally supported upon this cross bar. The outer end of the latch finger 16 is rolled as shown at 21 and this rolled end acts as a balancing weight for the finger. As is clearly shown in Figure 2 when the collar 9 is in position upon the bar 4, the latch finger 16 will have its sharpened edge 18 in contact with one side of the bar and this edge will always remain in contact with the bar owing to the weight of the rolled edge 21 of the finger.

Surrounding the collar 9 and supported upon the arms 10 and between these arms and the rolled top edges 11 is a float member 22 of cork or other appropriate material.

The rod 4 is preferably formed of square cross section and three of the four sides of the rod may have indications 23 thereon to suit various shapes and sizes of tanks.

When in use the weight 21 of the latch finger 16 will be raised to disengage the edge from the notches 5 on the bar 4, and the float 22 is moved to the bottom of the rod to rest against the foot 6. The rod and float is then inserted into a receptacle as shown in Figure 1 and when the float comes in contact with the fluid it will be raised upon the rod by the buoyant action of the fluid. The rod is forced downwardly until the foot contacts with the bottom of the tank, the float 22 being raised on the rod as the rod is forced downwardly through the fluid. When the foot has reached the bottom of the tank, the rod is withdrawn. As soon as the rod is raised from the bottom of the tank, the weight 21 of the finger 16 will cause the edge 18 of the finger to engage the side of the rod 4, thus preventing the float from sliding downwardly as the rod is withdrawn and holding it firmly in the position at the point to which it was raised by the fluid. The reading is then taken from the underside of the float 22, the rod being numbered from the bottom upwardly and the point or numeral closest to the bottom of the float indicating the quantity of fluid in the receptacle. Knowing the quantity of fluid which the receptacle holds and deducting from this figure the amount indicated at the lower side of the float 22 upon the rod, will give as the result the quantity of fluid necessary to fill the tank.

From the foregoing it will be seen that a very efficient and accurate measuring device is provided for quickly and easily determining the quantity of fluid within a tank and owing to the positive indication given by the cork float by indicating at its lower edge the exact height which the fluid measured upon the rod there can be no doubt as to the height which the fluid arose against the rod as is the case in the rods where dependence is put in the wetting action of the fluid against the rod to indicate the depth of the fluid within the receptacle.

Having thus described my invention, what I claim is:

1. A measuring instrument of the character described comprising, a graduated rod of square cross section, a four sided collar surrounding said rod, an outwardly extending arm upon each side of said collar at the bottom edge thereof, the top of three sides of said collar being rolled, a float supported between said arms and rolled edges, an outwardly and upwardly inclined frame secured at its lower portion by said rolled edges, and a centrally pivoted latch finger supported by the upper part of said frame and automatically engaging said rod to prevent the collar and float from sliding downwardly thereon.

2. A measuring instrument of the character described comprising, a graduated rod of square cross section, a four sided collar surrounding said rod, an outwardly extending arm upon each side of said collar at the bottom thereof, the top edge of three sides of said collar being rolled, a float supported between said arms and rolled edges, an outwardly and upwardly inclined frame secured at its lower portion by said rolled edges, and a latch finger having its central portion formed to provide a bearing through which bearing the upper portion of said frame extends to support the finger, said finger further having its outer end rolled to provide a weight to cause the inner end to swing upwardly and engage said rod to prevent the float from slipping downwardly thereon.

In testimony whereof, I affix my signature hereto.

CHARLES L. SCHMIDT.